US010664483B2

(12) United States Patent
Koutrika et al.

(10) Patent No.: US 10,664,483 B2
(45) Date of Patent: May 26, 2020

(54) AUTOMATED CONTENT SELECTION

(71) Applicant: Hewlett-Packard Development Company, L.P., Fort Collins, CO (US)

(72) Inventors: Georgia Koutrika, Palo Alto, CA (US); Jerry Liu, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 263 days.

(21) Appl. No.: 15/114,395

(22) PCT Filed: Jan. 30, 2014

(86) PCT No.: PCT/US2014/013888
§ 371 (c)(1),
(2) Date: Jul. 26, 2016

(87) PCT Pub. No.: WO2015/116108
PCT Pub. Date: Aug. 6, 2015

(65) Prior Publication Data
US 2016/0342599 A1 Nov. 24, 2016

(51) Int. Cl.
*G06F 7/00* (2006.01)
*G06F 16/2457* (2019.01)
(Continued)

(52) U.S. Cl.
CPC ...... *G06F 16/24578* (2019.01); *G06F 16/248* (2019.01); *G06F 16/24575* (2019.01); *G06F 16/335* (2019.01); *G06F 16/9535* (2019.01)

(58) Field of Classification Search
CPC .......... G06F 17/3053; G06F 17/30867; G06F 17/30528; G06F 16/335; G06F 16/24578; G06F 16/24575
(Continued)

(56) References Cited

U.S. PATENT DOCUMENTS 8,005,643 B2 * 8/2011 Tunkelang ............ G06F 16/245
702/179
8,035,855 B2 10/2011 Monga et al.
(Continued)

FOREIGN PATENT DOCUMENTS

JP 2005-339123 A 12/2005

OTHER PUBLICATIONS

Carol Barry, "Document Representations and Clues to Document Relevance", Jrnl of the Amer Soc for Info Science, 49(14), 1293-1303, 1998.
(Continued)

*Primary Examiner* — Md I Uddin
(74) *Attorney, Agent, or Firm* — Fabian VanCott

(57) ABSTRACT

Automated content selection is disclosed. An example method includes generating a plurality of rankings for each document in a set of input documents, each ranking based on separate interesting document properties. The method also includes selecting a subset of the set of input documents, wherein each document selected for the subset is based on rankings of the selected document. The method also includes determining interesting properties of the subset. The method also includes selecting a subset with respect to parameters being optimized. The method also includes outputting a composition including the documents in the subset.

20 Claims, 6 Drawing Sheets

(51) Int. Cl.
*G06F 16/248* (2019.01)
*G06F 16/9535* (2019.01)
*G06F 16/335* (2019.01)

(58) Field of Classification Search
USPC ......... 707/723, 734, 741, 751, 736, 999.001
See application file for complete search history.

(56) References Cited

U.S. PATENT DOCUMENTS

| | | |
|---|---|---|
| 8,045,188 B2 | 10/2011 | McCarthy et al. |
| 2010/0293048 A1 | 11/2010 | Singolda et al. |
| 2011/0093520 A1 | 4/2011 | Doyle et al. |
| 2012/0076413 A1 | 3/2012 | Ferman |
| 2012/0159314 A1 | 6/2012 | Schrier et al. |
| 2012/0226602 A1* | 9/2012 | Narcisse ............... G06Q 30/02 705/39 |
| 2013/0007586 A1 | 1/2013 | Thomas |
| 2013/0024757 A1 | 1/2013 | Doll et al. |
| 2014/0164365 A1* | 6/2014 | Graham ............... G06Q 50/01 707/723 |

OTHER PUBLICATIONS

Clarles Clarke et al, "Novelty and Diversity in Information Retrieval Evaluation", Jul. 20-24, 2008.
Exploiting Relevance, Coverage, and Novelty for Query-focused Multi-document Summarization.
Liangda Li et al, "Enhancing Diveristy Coverage and Balance for Summarization through Structure Learning", Apr. 20-24, 2009.
Yi Zhang et al, "Novelty and Redundancy Detection in Adaptive Filtering", Aug. 11-15, 2002.

* cited by examiner

AUTOMATED CONTENT SELECTION

BACKGROUND

The client/server computing environment continues to expand into web services, with the latest iteration of Internet supported programmatic access to information available from many different sources. An example is online publishing, which provides users with one-stop access to information from many varied sources. In online publishing, compiling this information from many different sources for synthesis as a single publication can be a big challenge.

Traditionally, this challenge has been addressed by human news editors who manually sift through news "stories" from many varied sources, and synthesize the stories for publication. More recently, newsfeeds have been deployed which implement simple filters to sort through the news stories and distribute stories matching the reader's preferences based on, for example, category (e.g., sports, headline news, entertainment), time (e.g., date of the story), and/or locality (e.g., having geographical relevance to the reader). While manual editorial and/or filter-assisted newsfeeds can help ensure relevancy of the information provided to the reader, these techniques do not scale well for a large, diverse readership.

DETAILED DESCRIPTION

Figure 1:
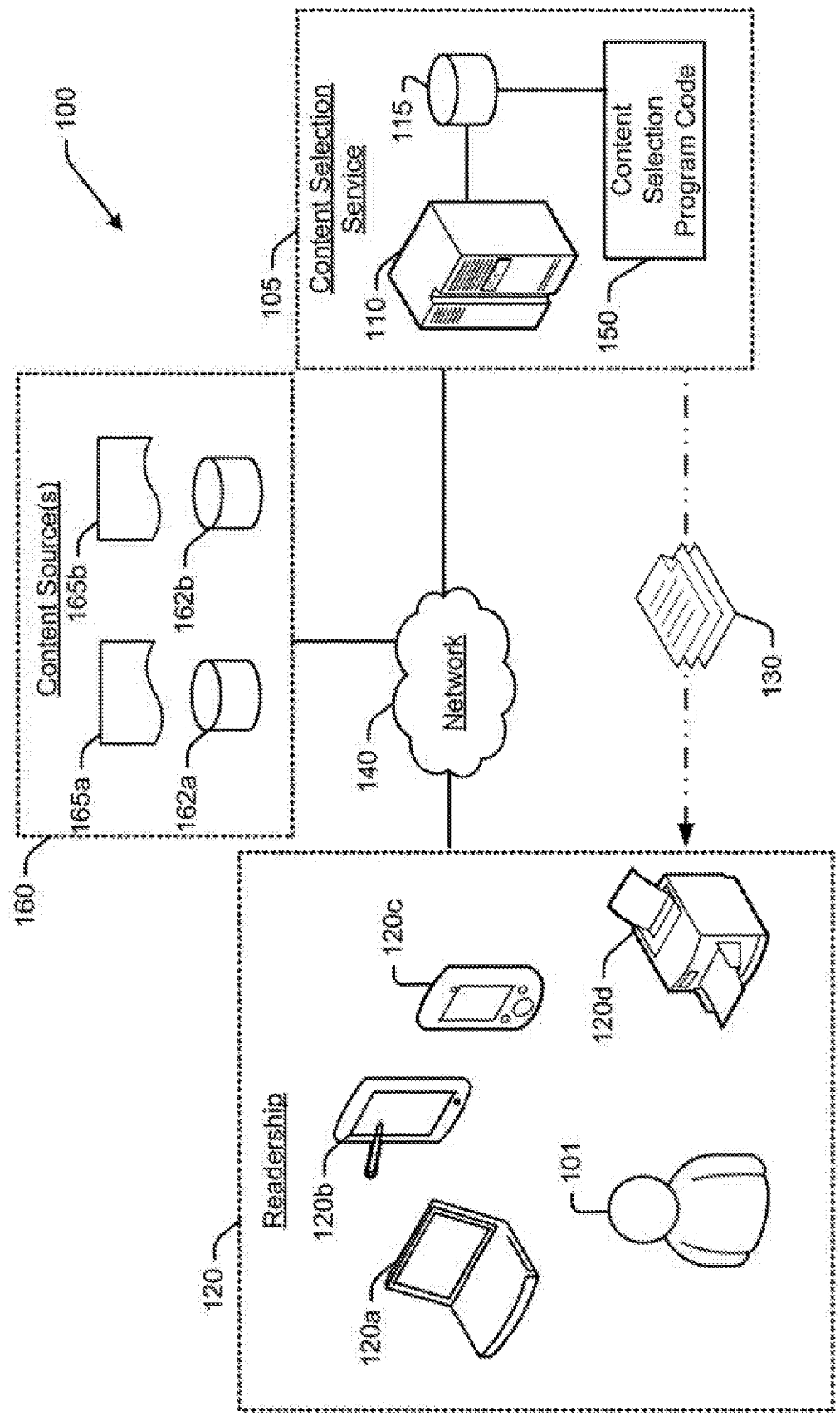
FIG. 1 is a high-level illustration of an example networked computer system which may implement automated content selection.

Publishing has become a complex task, particularly when serving a large, diverse readership. The numerous sources (both online and offline) for information that are available today (and likely continuing to increase in the future) make this task even more complicated. A big challenge facing publishers is how to effectively select stories from a variety of different sources (e.g., an information pool), and assemble or compile that content in a publication that is interesting to the readership. This challenge has to be addressed at both the level of (1) defining what is considered "interesting" to the readership, and (2) meeting the needs to the readership in a timely and effective manner.

Automatic layout engines may be used to programmatically assemble stories for publishing. But before an automatic layout engine can be utilized, the content has to already be selected. This job typically falls to a human editor and is handled manually and/or using simple filters. As such, human editors have traditionally headed newspapers, magazines, and other print sources; and even as producers in the realm of televised, radio, and online media. However, this is a time-consuming (and hence expensive) process which cannot be readily scaled without hiring more human editors.

With more publications going online in the past decade, basic filter based selection has helped sift through the stories generated by a multitude of information sources (e.g., news agencies). While basic filters can help sort stores that are relevant to a particular readership, these filters are often based on simple heuristics, such as identifying sports stories for a sports magazine or sports section. These filters typically cannot quantitatively measure or otherwise ensure that the stories are "interesting" to the readership. Moreover, these filters may find multiple stories covering the same event (albeit from different sources), and hence still have to be manually sorted by an editor prior to publication.

Some editors may rely on a readership recommendation based approach, to help guide their decisions. These recommendations are similar to consumer-recommendations and/or reviews (e.g., traditionally used by online retail establishments, service providers, and movie reviews). While the core techniques (e.g., machine learning and classification methods) used to recommend goods and services to users can be also applied in the publishing realm, the problem publishers face is fundamentally different and more challenging than that faced by retailers and service providers. That is, user reviews typically deal with only two types of entities, the users and the item(s) to be purchased. These entities can be readily connected via a simple, two-dimensional rating system (e.g., a one to five star ratings for each product). In addition, user reviews can be readily defined as a prediction problem, wherein the goal is to estimate missing ratings and select the top rated items based on this estimate.

Publishing is more involved, dealing with content that may be described across many dimensions. Content selection thus involves more than a simple prediction mechanism. Instead, publishing is based on selecting content that is considered a good fit for the readership along as many of the available dimensions as possible, such that the aggregate (i.e., the publication) also exhibits a good fit.

A good fit is often defined in terms of being interesting to the readership. The term "interesting" is used herein generally to mean attracting and holding the attention of a reader, causing the reader to want to team more about and/or be involved in a particular topic or subject matter. Generally, a topic and/or subject matter may be considered interesting if it engages or otherwise stimulates the reader, for example, by invoking a curiosity and/or satisfying a need for information However, the term "interesting" is not limited to a narrow definition, and may also include, but is not limited to meaning eye-opening, astonishing, amusing, entertaining, eventful, provocative, and/or inspiring.

In an example, the term "interesting" may mean that the content is informative to the readership. The term "informative" is used herein generally to mean providing useful or instructive information. Generally, content is considered instructive if it is useful, e.g., by educating, instructing, and/or illuminating a particular topic and/or subject matter. However, the term "informative" is not limited to a narrow definition, and may also include, but is not limited to meaning enlightening, newsworthy, practical, and/or useable information.

Automated content selection is described herein as the systems and methods that may be deployed to analyze a large number of varied sources of information, and select content that is relevant to a large, diverse readership. In an example, the selected content is interesting to the readership. In an example, the "publication" can be extended from a single newspaper or magazine, to a publication that draws from the numerous sources of content that are now available. The technique is based on content being multi-dimensional, and evaluates these dimensions according to a systematic approach such that content can be automatically selected for a publication. The automated approach enables content to be drawn from a vast number of sources (many more than a single editor, or even small team of editors, could evaluate in a timely manner), while still resulting in a publication that is considered interesting to its readership, just as if the stories had been hand-picked by a human editor.

An example of automated content selection includes a computer program product embodied as computer-readable instructions stored on a non-transient computer-readable media and executable by a processor. Automated content selection proceeds by iteratively scoring a document in a set of documents based on multi-dimensional selection criteria. Each of the multi-dimensional selection criteria result in an individual score of the document. The individual scores are combined to derive an aggregate score for the document. Content selection then proceeds by generating a subset of the set of documents, wherein each document selected for the subset is based on the aggregate score of the selected document. Properties of the subset are computed and the properties of the subset are aggregated into a single score. A composition (e.g., the publication) is output including the documents from the subset as determined based on the single score.

In an example, the following terms are defined to have the meaning set forth herein. However, other interpretations of these terms are also possible, consistent with the meaning set forth herein. The meaning of these terms is illustrative and not intended to be limiting in any manner, except to the extent a term is specifically defined in the claims as having a particular meaning.

The term "content" is used broadly herein as an umbrella term meaning any work conveying information, be it in words, artwork, photographs, videos, or other format. Example types of content that are discussed herein include, but are not limited to, documents and compositions. Content may also include additional subject matter, such as but not limited to Internet web pages and even hyperlinks to other web pages.

The term "document" is used herein generally to mean any piece of compiled content in written, printed, and/or electronic form. Generally, documents include words ordered into sentences and may be organized into paragraphs and further organized by headings and subheadings (e.g., stories). However, the term "document" is not limited to any particular organization. Nor is the term document limited to any particular content (e.g., stories). Documents may include any content, e.g., coupons. In addition, documents are not limited to only text, and may also include other subject matter, such as but not limited to photographs, artwork, and video.

The term "composition" is used herein to refer to the "publication" and generally means any arrangement of subject matter, for example, the arrangement and/or combination of documents. However the term "composition" is not limited herein to a narrow definition and includes any combination of parts and/or elements.

Before continuing, it should also be noted that the terms "includes" and "including" are used herein to mean, but are not limited to, "includes" or "including" and "includes at least" or "including at least." The term "based on" is used herein to mean: but is not limited to "based on" and "based at least in part on."

FIG. 1 is a high-level illustration of an example networked computer system 100 which may implement automated content selection. System 100 may include any of a wide variety of computing devices now known and/or later developed. For example, computing devices may be implemented at both the content selection service 105 (e.g., as host 110) and by the readership 120 of publication 130 (e.g., access via computing devices 120*a-d*).

It is noted that the computing devices may include memory, storage, and a degree of data processing capability at least sufficient to manage a communications connection either directly with one another or indirectly (e.g., via a network 140). At least one of the computing devices (e.g., host 110) is also configured with sufficient processing capability to execute the program code 150 described herein.

In an example, the readership 120 (or subscription base) may have access to the publication 130 via the Internet. For example, the readership 120 may include any end-user 101 having access to the publication 130 via a laptop computer 120*a*, a tablet 120*b*, or another computing device such as mobile device 120*c*. The readership 120 may even have access to the resulting publication via a printer 120*d* or other output device (e.g., a television). The publication 130 may be distributed to the readership 120 according to any suitable format, including but not limited to traditional print distribution, online, and both online and in traditional print media. However, the techniques described herein are not limited to any particular access to the publication 130 by the readership 120.

Content selection service 105 may be implemented in any suitable environment to provide the readership 120 with publication 130. In an example, content selection service 105 is implemented as an online data processing service executed by a host 110 (e.g., a server or multiple servers, such as a server farm or distributed server environment). The host 110 is configured with processing capability and has access to computer-readable storage 115, for storing and executing the content selection program code 150. The server 110 may also include interfaces to application programming interfaces (APIs) and related support infrastructure.

In an example, the content selection service 105 has access to at feast one source 160 of content. The source 160 may be local to the service 105, and/or the source may be physically distributed in the network and accessible, e.g., via the Internet and/or other private and/or public communications networks. The source 160 may include data storage 162*a-b* configured to store the content 165*a-b* (e.g., in databases 162*a-b*).

The content selection service 105 may have access to any of a wide variety of different types of content sources 160. For example, content sources may include but are not limited to public and/or private (e.g., subscription-based) sources of content hosted on the Internet or other network. There is no limit to the type or amount of content 165*a-b* that may be accessed by the content selection service 105.

The content selection service 105 may execute the content selection program code 150 to implement the automated content selection techniques described herein. In an example, content selection is defined as a multi-criteria optimization (or decision) problem. The decision problem may be based on any suitable selection criteria such that solving the decision problem results in selection of content that is interesting to the readership. In an example, selection criteria may be an individual parameter defined for the readership. In another example, selection criteria may be defined using a multi-level approach. For example, selection may be based at least in part on individual content in the form of a set of content properties. These content properties may be defined to be considered interesting to the readership. Selection may also be based at least in part on a set of content exhibiting a set of properties. This set of properties may be defined as considered interesting to the readership.

As such, the resulting publication 150 is considered to be both "interesting" to the readership 120.

For purposes of illustration, consider a document collection (e.g., news articles). Selecting a document subset S of the document collection that is interesting to the readership 120 is a complex multi-criteria decision problem. However, this decision problem can be simplified by defining two stages of operation that guide the content selection. An example first stage includes determining document properties that capture different aspects of a document's nature as "interesting." An example second stage includes determining a set of properties that capture different aspects of a document set.

For the first stage, a document can be characterized as "interesting" based on several user-independent characteristics. These characteristics are referred to herein as the document properties. Example document properties that may be used to associate a level of "interesting" to the document may include any one or more of the following.

Relevance is a document property that can be used to determine whether the document is relevant to a particular publication. Relevance can be determined based on many factors, such as but not limited to topics and/or type of the publication the document already appears in.

Novelty is a document property that can be used to determine whether the document and/or information contained in the document is already known and/or has already been provided to the readership. However, novelty can be more complex than simply not duplicating existing knowledge and/or considering the document date or the date of the story covered by the document. A document based upon existing knowledge may still be of interest to the readership, for example if the strength of the information differs sufficiently from that which is expected by the readership. For example, another article on a new discovery or odd phenomenon may be considered to be quite novel to the readership, if the readership is continuing to seek information on that particular topic.

Representativeness is a document property that can be used to determine whether the document is generally representative of some class of documents or topics. A document may be considered to be representative if the information covers a related topic. For example, two separate news stories on a presidential speech, one discussing economic aspects and another one discussing social aspects, are both representative of the presidential speech, even though the news stories cover different topics from the speech.

Contextual Proximity is a document property that can be used to determine how closely related a document is to a particular context. By way of illustration, context can be geography, time, and/or other conditions. For example, geographical proximity of a news story to the readership is a measure of how far away the news is from the reader.

Timeliness is a document property that can be used to determine whether the document is occurring at a suitable or opportune time. Time is not limited in duration. For example, a particular story may be considered well-timed only if it occurs within so many days of the event, whereas another story may be considered well-timed if it is "hot" or trendy for the year.

Seventy is a document property that captures the importance or criticality of a document. Severity can be measured in different ways. For example, severity can measure the impact of a document based on a fraction of readership or general population affected by and/or showing interest in the story. For example, an article about a new legislation for US taxes may be more important to a particular readership, than a story on California schools (e.g., particularly when the readership is outside of the state of California). Seventy can also measure importance of a topic. For example, a story on a murder may be more important to the readership than a story on a traffic jam.

Authoritativeness is a document property that can be used to characterize the source or the author of the document. For example, government sources may be considered more authoritative than a blogger website.

In the second stage, properties of a set S of document D may include the following.

Diversity is a property that can be used to determine how diverse the documents are. Diversity can take into account different factors, such as topics, categories (e.g., opinions versus blogs). There may also be different measures of diversity, including but not limited to Skallak's disagreement measure, and the Kohavi-Wolpert variance.

Coverage is a property that can be used to capture how well the subset S covers documents. Coverage can be defined in different ways, such as but not limited to, based on a fraction of documents covered, and topics covered in the subset S.

Balance is a property that can be used to take into consideration the relative sizes of documents. In an example, the size of individual documents in the subset should be selected to be generally the same (e.g., 300-500 words as opposed to a 1000 word article and a 100 word article). However, other measures of balance may include some short and other long articles.

The program code 150 used to implement features of the system can be better understood with reference to the following discussion of various example functions.

Figure 2:
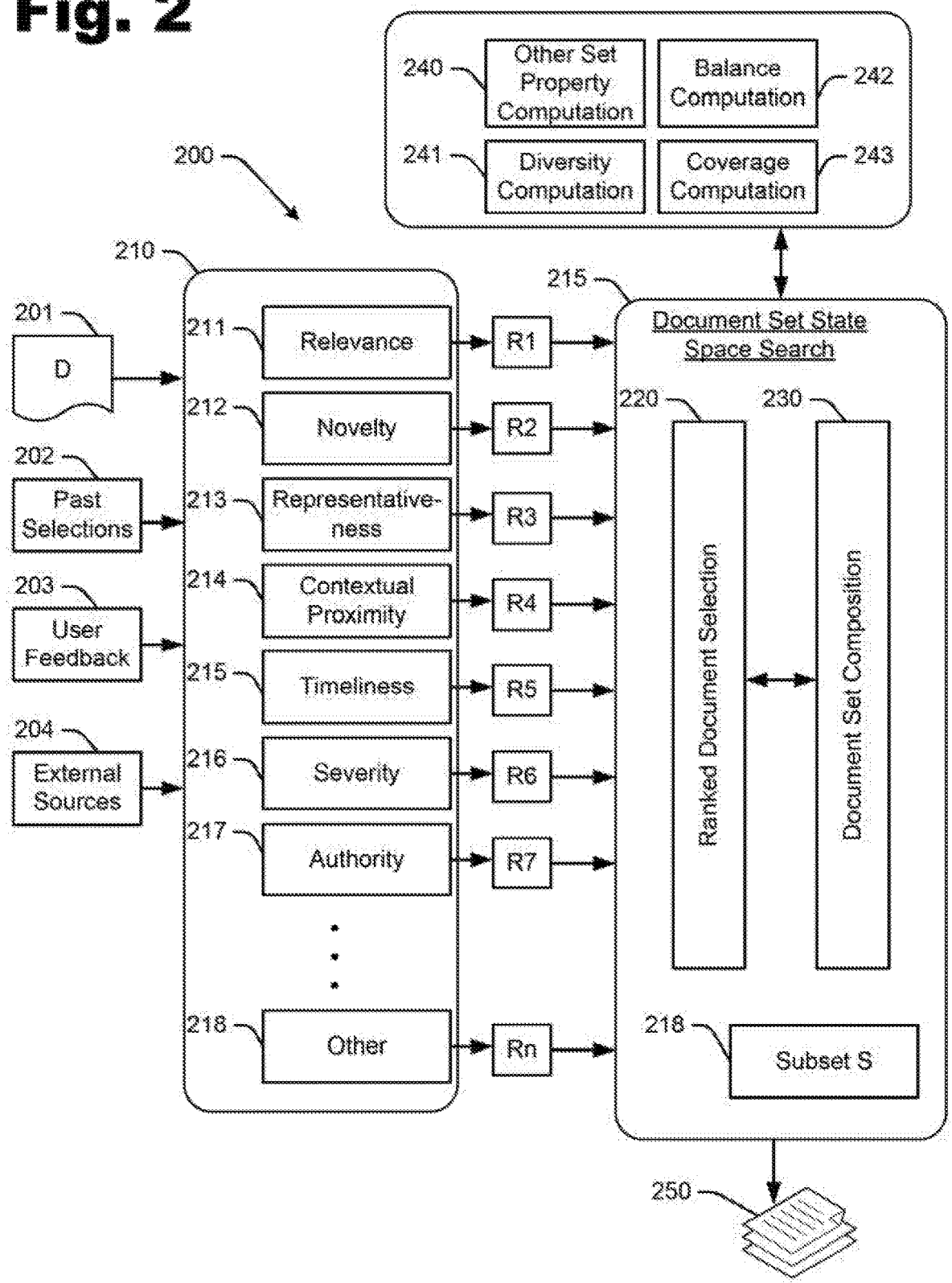
FIG. 2 is a block diagram of an example system to implement automated content selection.

FIG. 2 is a block diagram of an example system to implement automated content selection. In an example, the program code discussed above with reference to FIG. 1 may be implemented in machine-readable instructions (such as but not limited to, software or firmware). The machine-readable instructions may be stored on a non-transient computer readable medium and are executable by one or more processor to perform the operations described herein. It is noted, however, that the depiction in FIG. 2 is provided only for purposes of illustration of an example operating environment, and is not intended to be limiting in any manner.

The program code may execute the function of an architecture of machine readable instructions 200 as self-contained modules. These modules can be integrated within a self-standing tool, or may be implemented as agents that run on top of an existing program code in an example, the system may have as inputs: (a) the document set 201 from which to perform content selection, (b) a repository 202 with information about past document selections (e.g., to avoid duplicate or similar documents from being selected), (c) user feedback 203 (e.g., in the form of ratings, user selections, reviews) that can be analyzed to learn user preferences, and (d) external sources 204 (e.g., social sites for learning topics and desired article properties).

In an example, the modules may be implemented to iteratively score a document D in a set 201 of documents D1-Di based on multi-dimensional selection criteria. Multi-dimensional selection criteria were described above, and can be implemented in the program code as engines 210. Each engine 211-218 generates at its output, a relevance score R of each document D based on one of the document properties discussed above with reference to FIG. 1.

It is noted that an individual engine 211-218 may generate a complete ranking for a particular aspect. Alternatively, an engine 211-218 may not perform a full ranking a priori, but may be probed by a document selection algorithm and return top documents D in an incremental manner. In any case, each of the engines 211-218 218 may implement one or more scoring technique based on, e.g., clustering, classification, ranking functions, and textual analysts.

The relevance ranking engine 211 shown in FIG. 2 ranks documents based on relevance to the publication. Ranking may use textual features of the document (e.g., terms and topics), as well as non-textual features (e.g., document type, length, category, intended reading group). In an example, the ranking function implemented by relevance ranking engine 211 may be a text similarity method that compares the content (e.g., terms, topics) of a document with the content description of the publication. In another example, the ranking function may be a multi-class classifier that classifies documents into different classes based on their relevance. In another example, the ranking method may be a combination of methods, wherein each method computes partial relevance scores for documents, e.g., depending on different features of a document. A ranking function then combines partial relevance scores for a document (e.g., a score based on textual similarity with a score based on its category). In an example, a user feedback component of the relevance ranking engine 211 may leverage user feedback 203 to improve the ranking function (e.g., using Rocchio's relevance feedback mechanism), or the multi-class classifier may be part of the relevance ranking engine 211.

The novelty ranking engine 212 shown in FIG. 2 ranks documents based on novelty. In an example, the ranking function may take into account the timestamp of a document D. The novelty of document D may be computed using similarity and/or distance-based metrics for comparing the document against other documents in D and documents of past publications. However, novelty may also be considered more complex than simply avoiding duplicating existing knowledge or considering the document date. For example, a document D based upon existing knowledge may still be of interest to the readership if the strength of the content differs sufficiently from mat which is expected. For example, an article about the 2008 elections may be quite similar to an article about the 2012 elections; but in fact these cover two entirely different events. Therefore, the ranking function may recognize when two documents may refer to different events, people, and/or other important entities in order to consider otherwise like documents as novel.

The representativeness ranking engine 213 shown in FIG. 2 ranks documents according to how well and to what degree a document is generally representative of some class of documents or topics. In an example, the engine 213 may use centroid-based clustering, where clusters are represented by a central vector, and the representativeness score of the document D is computed based on how close the document D is to a centroid of a cluster; while at the same time being sufficiently far from all other centroids. As another example, a mixture model approach clusters data with the ultimate goal of using the cluster centers as points representative of the clusters, and of the document set as a whole. Working within the Bayesian paradigm formally encodes desirable properties of representation, such as those which are spread across the domain and thus balanced in cluster sizes.

The contextual proximity ranking engine 214 shown in FIG. 2 ranks documents based how well the documents match a current context. For example, the ranking may be based on a function measuring the distance of the location mentioned in the document, to the location of the readership. For example, a San Jose story may rank high for a San Jose publication. Other proximity factors may be used, such as but not limited to, nationality of the readership, education level, and/or family status (married with children or single), just to name a few examples.

The timeliness ranking engine 215 shown in FIG. 2 ranks documents based on whether it is the right moment for the document to appear in a publication. Timeliness may be measured using different metrics. For example, the ranking engine 215 may consider whether the document topics are currently popular or trending, whether the document content is appropriate to a given context, or other metrics. For example, Hinrich's formula can be adapted to estimate whether the topics of a document (and hence the document itself) is outdated. External sources 204 may also be used, such as but not limited to analysis of social sites to identify trending or "hot" topics.

The severity ranking engine 216 shown in FIG. 2 ranks documents based on some metric of importance or impact. Different metrics can be used, such as importance or impact of a particular topic to a particular type of readership. For example, topics related to child welfare may have a greater impact on a readership of parents of small children; whereas student loan topics may have a greater impact on a readership of college students and/or their parents. In an example, a multi-class classifier may be trained on previous documents to learn features (such as topics, types, entities or events covered) of documents. Crowd-sourcing may also be used to provide training data. Again, external sources 203 may be used, such as social media sites to help identify high impact topics.

The authoritativeness ranking engine 217 shown in FIG. 2 ranks documents based on authority of the source. Authority may be determined by the type of publication (e.g., government publication versus blog), the author, and/or other metrics to determine authority. In an example, the engine 217 can combine information retrieval, usage mining, and/or hyperlink structure analysis techniques to identify and locate authoritative documents. For example, given the web graph of sources and/or the social graph that connects authors and followers, the ranking engine can use link analysis methods such as page rank used to identify a website authority for search engines.

The multi-dimensional selection criteria result in individual scores R1-Rn (for each of the selection criteria 210) for each document D in the set 201. It is noted that each interesting document property score may in turn be computed taking into account different metrics and/or different ways to compute these metrics. For example, the relevance score of a document may be a function of the topic relevance score and document type relevance score and the topic relevance may be computed using different functions (e.g., cosine and Jaccard similarity).

Figure 3:
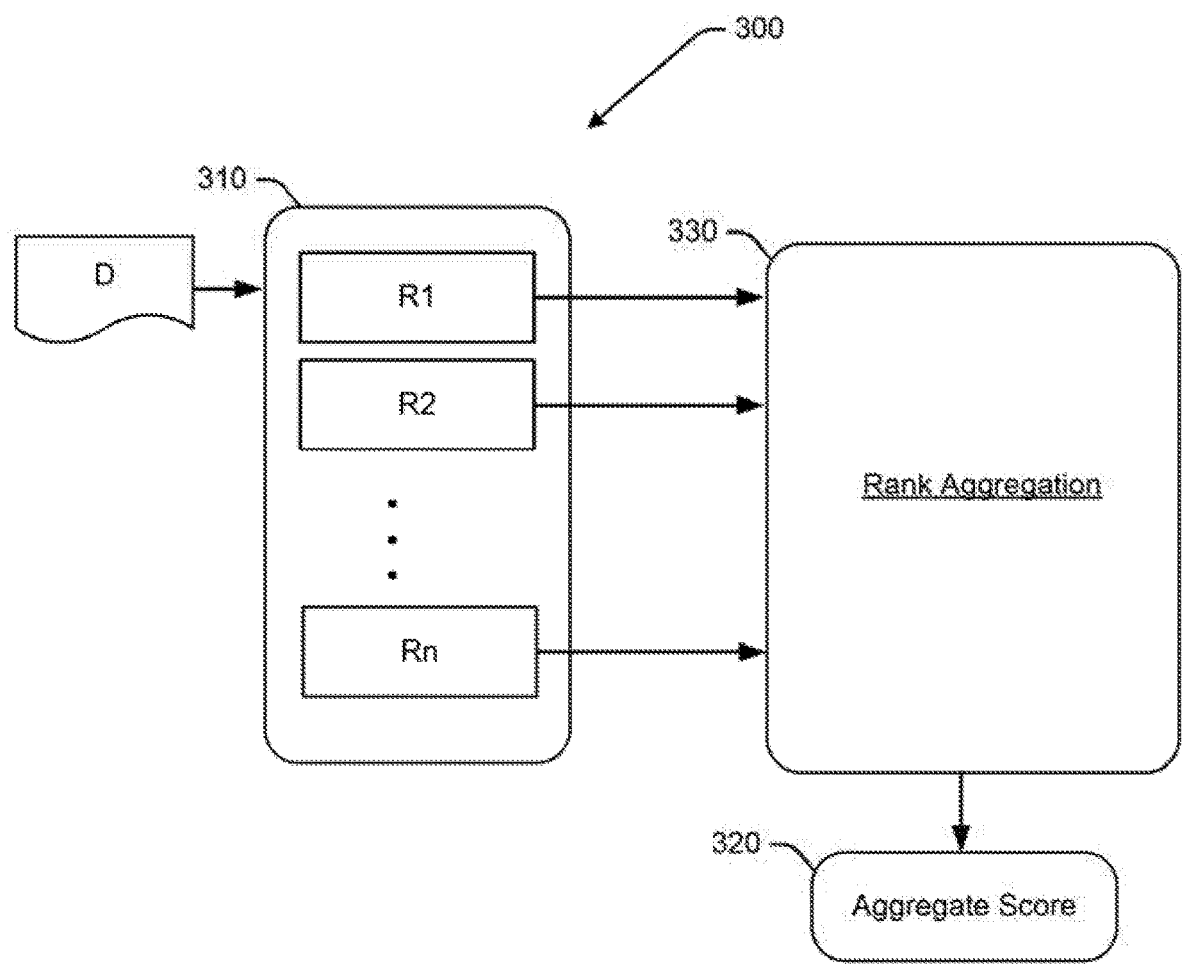
FIG. 3 is a detailed block diagram illustrating an example ranking engine which may be implemented by the system shown in FIG. 2.

The individual document scores R1-Rn may then be combined to derive an aggregate score for the document. FIG. 3 is a detailed block diagram illustrating an example ranking engine 300 which may be implemented by the system shown in FIG. 2. In this illustration, each ranking 310 of the document D may be computed, as described above with reference to FIG. 2. An aggregated score 320 may be computed by a rank aggregation engine 330. Rank aggregation engine 330 may compute the aggregated score 320 based on any one or more of the scores R1-Rn of a document D, e.g., by taking into account different metrics and combining these metrics. For example, the aggregated score 320 may be a function of the topic relevance score and document type relevance score.

In an example, an overall strength of the document D may be based at least in part on a weighted adherence to each criterion separately. For example, each of the interesting document properties may be given different weightings (Wx), measured as a percent of the total, and combined into an aggregate score for each document D. For example, if relevance is more important than novelty, the weighted average of these scores gives relevance a higher weight for finding an aggregate score.

Again with reference to FIG. 2, the program code includes a document set state search space 215 to identify candidate document subsets, and further to identify a subset S from the candidate subsets. A subset (S) is based on the parameters selected for optimization (e.g., based on the readership), along with any constraints. For this purpose, the document set state search space 215 may employ a search strategy for examining the space of document subsets. Depending on the form of the optimization problem to be solved, different algorithms may be appropriate to collectively solve two problems: ranked document selection 220 and document set composition 230.

In an example, the ranked document selection module 220 defines a strategy on how to probe documents from each ranking engine. For example, an algorithm can be used when an aggregate score for a document is computed from all partial interesting scores. The algorithm may perform a sorted access to each ranking. For each document D, the module 220 accesses other rankings to retrieve the missing document scores, and computes the aggregate score of each document. Documents are ranked based on their aggregate scores and the top documents are selected for the subset S. In an example, a skyline or voting algorithm may be used when there is no aggregate function for the partial document scores.

The document set composition module 230 specifies a strategy to combine documents D into candidate document sets for the subset S, and collaborates with a set property computation module 240 to compute the properties of a candidate set. A set of set property computation modules may also be used to provide estimations of the property values for a specific candidate set of documents. For example, a diversity computation module 241 may be used to compute diversity among documents within a candidate set. A balance computation module 242 may be used to compute balance among the documents in a candidate set. A coverage computation module 243 may be used to compute coverage among the documents in a candidate set. These modules 240-243 may use an exact or approximate method with a tradeoff between accuracy and efficiency.

In an example, an exhaustive enumeration of all possible sets is prohibited. Furthermore, interesting documents may not necessarily build sets that have interesting set properties. For example, choosing the most relevant documents may lead to a highly unbalanced or focused set. it is possible that the overall problem can be tackled as a multi-objective constrained optimization problem. The constraints on certain document and/or set properties can be used to prune the search space. It is noted that the document properties are expected to be independent, making the optimization problem NP-hard.

Properties of the subset S may then be computed, and the properties of the subset S can be aggregated into a single score. A composition 250 including the documents D selected for the subset S may then be output (e.g., as a publication for the readership), based at least in part on the single score.

It is noted that using an aggregate score (one score per document D) and a single score for the subset, the problem can be considered a two-stage, single-objective optimization problem. At the other end of this spectrum, the problem can be treated as a multi-objective constrained optimization problem, optimized toward some of the document and/or set properties, while maintaining constraints on the remaining properties. For example, the ranking engines 210 may maximize relevance and novelty while maintaining the remaining document properties within some predefined limits.

Before continuing, it should be noted that the examples described above are provided for purposes of illustration, and are not intended to be limiting. Other devices and/or device configurations may be utilized to carry out the operations described herein.

Figure 4:
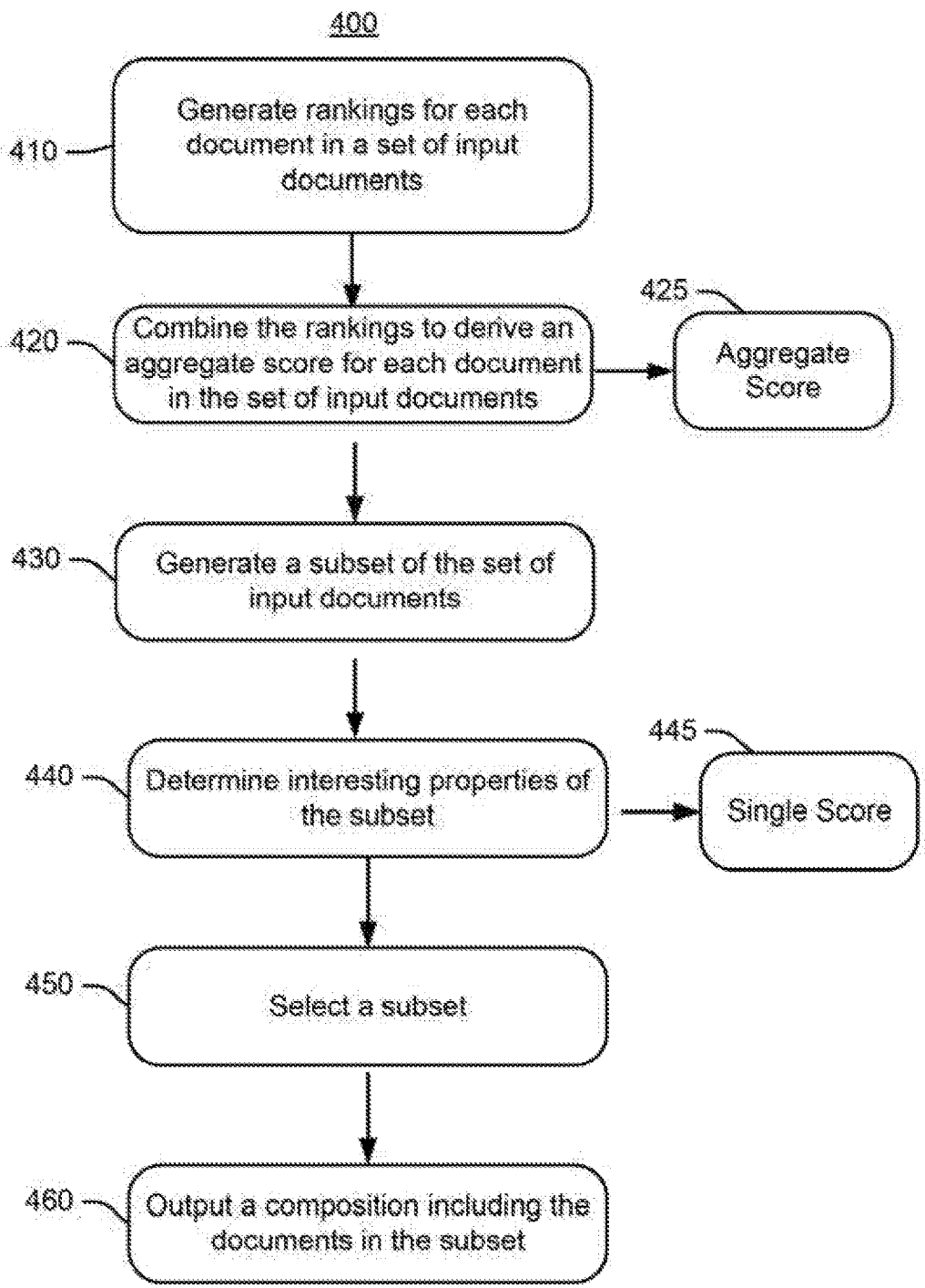
FIGS. 4-6 are flowcharts illustrating example operations to implement automated content selection.
Figure 5:
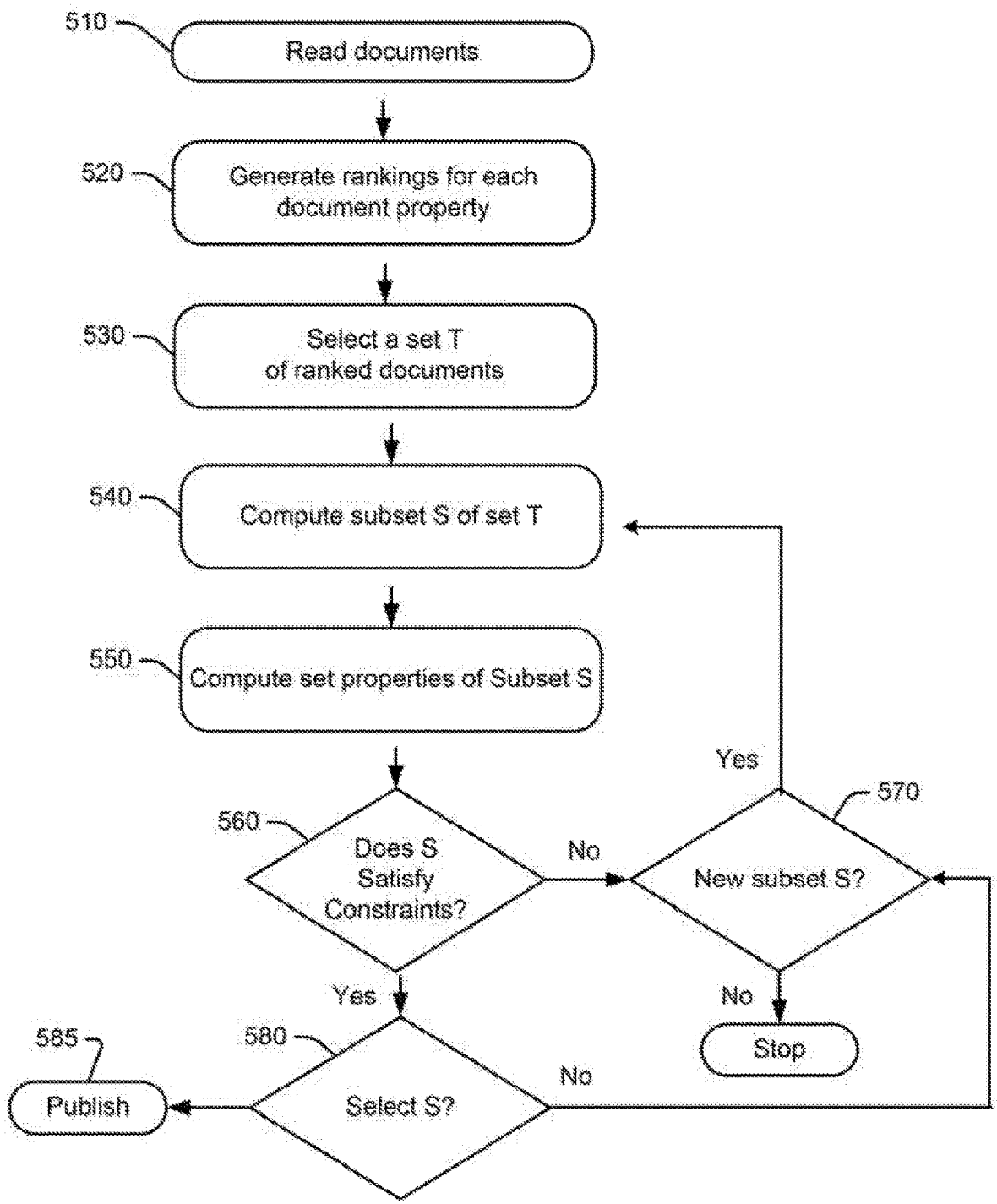
Figure 6:
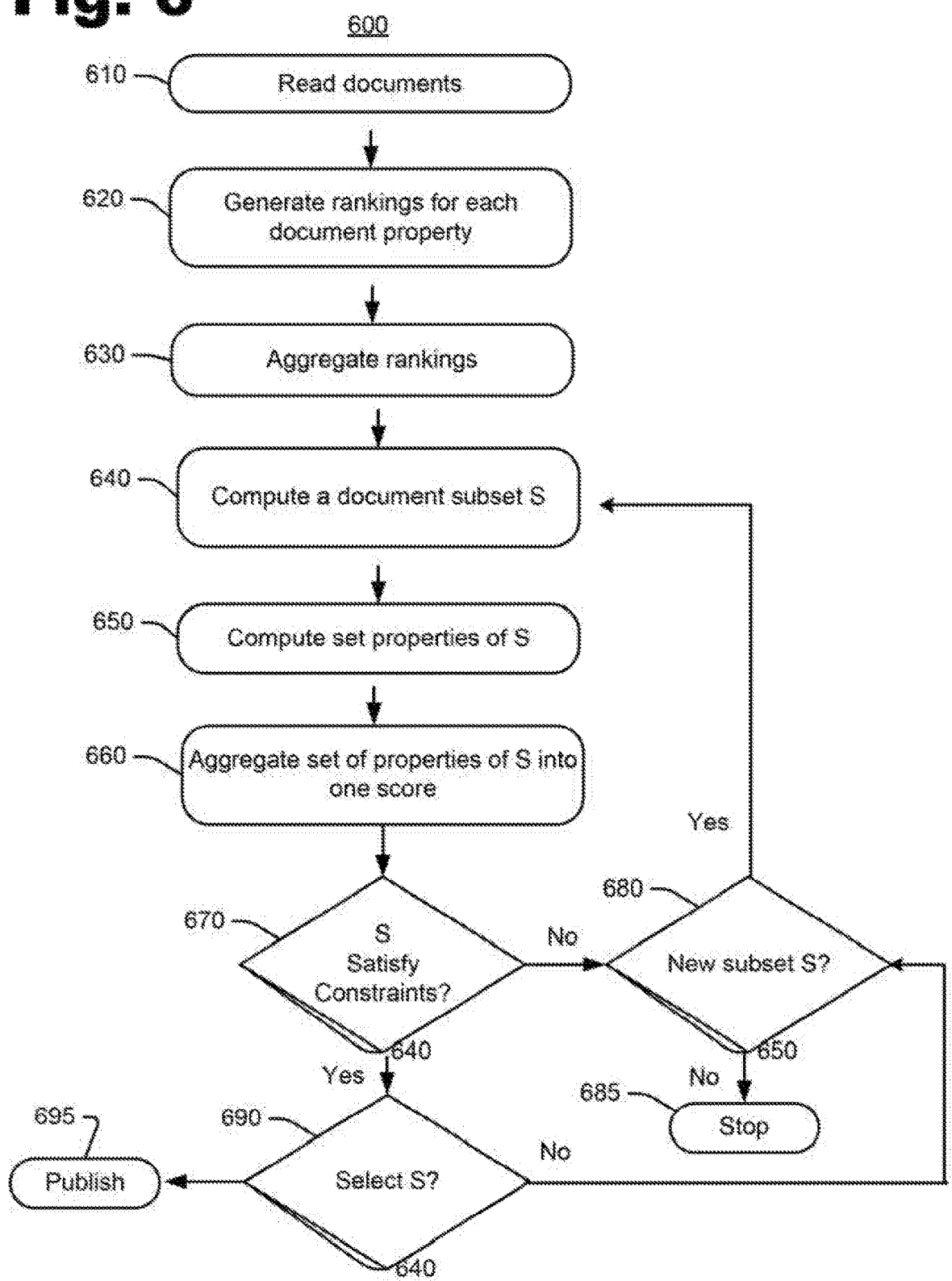

FIGS. 4-6 are flowcharts illustrating example operations to implement automated content selection. Operations may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

FIG. 4 is a flow diagram showing example operations 400 for automated content selection. Operation 410 includes generating a plurality of rankings for each document in a set of input documents. Each ranking may be based on separate interesting document properties. In an example, operation 420 includes combining the rankings for each of the separate interesting document properties. The combined rankings may be used to derive an aggregate score 425 for the document D. In another example, the rankings are not combined, and the individual rankings are used.

Operation 430 includes generating a subset of the set of input documents. In an example, each document selected for the subset is based on the aggregate score of the selected document. In another example, the individual rankings are used.

Operation 440 includes determining interesting properties of the subset. Properties of the subset S may include, but are not limited to, diversity, coverage, and balance. Generating the subset S may be based at least in part on user feedback. Generating the subset S may be based at least in part on external sources for identifying desired article properties.

In an example, the interesting properties of the subset may be aggregated into a single score 445. In another example, the properties are not combined, and the individual properties are used.

Operation 450 includes selecting a subset with respect to parameters being optimized. Operation 460 includes outputting a composition (e.g., a publication for the readership) including the documents in the subset.

The operations shown and described herein are provided to illustrate example implementations. It is noted that the operations are not limited to the ordering shown. Still other operations may also be implemented, e.g., as illustrated in FIGS. 5-6.

FIG. 5 is a flow diagram showing example operations 500 for automated content selection as a multi-objective constrained optimization. Operation 510 includes reading the documents D. Operation 520 includes generating rankings for each document property. Operation 530 includes selecting a set T of ranked documents. Operation 540 includes computing a subset of documents from the set T of ranked documents. Operation 550 includes computing set properties of the subset S.

A determination 560 is made, whether the subset S satisfies constraints. Constraints may include any predefined type and/or number of constraints determined to provide a publication that is interesting to the readership. It is noted that the constraints may depend in large part on the universal preferences of the readership.

If the subset S does not satisfy these constraints, another determination 570 is made whether to select a new subset S. A new subset S may be selected by returning to operation 540. Else, the operations may stop at 575, e.g., for manual intervention or to wait for new documents to come available.

If the subset S is determined (e.g., at 560) to satisfy these constraints, then another determination 580 may be made whether the subset is "optimal" (e.g., most appropriate based on parameters specific to the readership). This determination may be made based on any number of criteria, such as but not limited to publication guidelines. If the subset is considered optimal (e.g., most appropriate based on parameters specific to the readership), then the publication may be issued at 585. Else, determination 570 may be made whether to select a new subset S.

FIG. 6 is a flow diagram showing example operations 600 for automated content selection that uses one aggregated "interestingness" score per document, and one aggregated interestingness score per document set. Operation 610 includes reading the documents D. Operation 620 includes generating rankings for each document property. Operation 630 includes aggregating the rankings from operation 620. Operation 640 includes computing a subset S from the ranked documents. Operation 650 includes computing set properties of the subset S. The set properties may be aggregated in operation 660.

A determination 670 is made, whether the subset S satisfies constraints. Constraints may include any predefined type and/or number of constraints determined to provide a publication that is interesting to the readership. It is noted that the constraints may depend in large part on the universal preferences of the readership.

If the subset S does not satisfy these constraints, another determination 680 is made whether to select a new subset S. A new subset S may be selected by returning to operation 640. Else, the operations may stop at 685, e.g., for manual intervention or to wait for new documents to come available.

If the subset S is determined (e.g., at 670) to satisfy these constraints, then another determination 690 may be made whether the subset is optimal (e.g., most appropriate based on parameters specific to the readership) for the readership. This determination may be made based on any number of criteria, such as but not limited to publication guidelines. If the subset is optimal (e.g., most appropriate based on parameters specific to the readership), then the publication may be issued at 695. Else, determination 680 may be made whether to select a new subset S.

It is noted that the operations may be implemented at least in part using an end-user interface (e.g., web-based interface). In an example, the end-user is able to make predetermined selections, and the operations described above are implemented on a back-end device to present results to a user. The user can then make further selections. It is also noted that various of the operations described herein may be fully automated or partially automated.

The automated content selection techniques described herein tackle a severe problem in publishing, that has until now been performed manually (e.g., as editors for news publications) and/or semi-randomly using simple filters (e.g., as in online news feeds). The automated content selection techniques described herein reduce or altogether eliminate the need for traditional editors; and utilize multi-dimensional selection criteria to produce a better overall result than could be achieved by employing simple filters.

The automated content selection techniques described herein has many applications. In addition to more traditional venues (e.g., magazines, newspapers), the automated content selection techniques described herein also has application in other fields. For example in education, the automated content selection techniques described herein may be utilized for organizing online educational material for learning purposes (e.g., course materials for both K-12 and university level education), and in research and development (e.g., publications for keeping abreast of scientific endeavors). The automated content selection techniques described herein may also be used for personalizing content delivery to different users depending on their goals, for example when used in marketing for a business with a specific customer base. Implementation of the automated content selection techniques described herein to these and other example applications will be readily understood by those having ordinary skill in the art after becoming familiar with the teachings here.

It is noted that the examples shown and described are provided for purposes of illustration and are not intended to be limiting. Still other examples are also contemplated.

The invention claimed is:

1. An optimization method for a user interface to output a publication of compiled content pieces by automatically selecting content that is interesting to a readership of the publication, comprising:
   identifying a set of interesting document properties, the set comprising a plurality of document properties, wherein each of the document properties is a different document property that indicates whether a corresponding document should be included in the compiled publication and will be interesting to the readership of the publication;
   generating a plurality of rankings for each document in a library of documents, each ranking based on a different one of the interesting document properties, such that, for each document in the library, a plurality of rankings for that document is determined, one ranking as to each of the plurality of interesting document properties for each input document;
   based on the rankings, selecting a set of input documents from among the documents of the library;
   identifying multiple document set properties that are different from the interesting document properties, each document set property characterizing a different aspect of a document set as to suitability for the readership of the publication;
   selecting a subset of documents from the set of input documents;
   determining a score of the subset of documents based on the document set properties;
   determining whether to include the subset in the publication based on the score of the subset with regard to the document set properties; and,
   when a first subset of input documents is approved for the publication based on the document set properties, producing the publication including the documents in the first subset.

2. The method of claim 1, further comprising combining rankings for each of the separate interesting document properties to deride an aggregate score for each document.

3. The method of claim 1, wherein selecting the subset is based on at least one of user feedback and external sources for identifying desired article properties.

4. The method of claim 1, further comprising assigning different weightings to the different interesting document properties.

5. The method of claim 1, wherein the separate interesting document properties are user-independent.

6. The method of claim 1, wherein the interesting document properties include relevance, novelty, representativeness, contextual proximity, timeliness, severity, and authoritativeness.

7. The method of claim 1, wherein the document set properties include diversity, coverage, and balance.

8. The method of claim 1, further comprising:
selecting multiple subsets of documents from the set of input documents;
determining a score for each of the multiple subsets of documents based on the document set properties; and
identifying the first subset to be included in the publication from among the multiple subsets of documents based on the document set properties.

9. The method of claim 4, further comprising, generating an aggregate score for a document as to the interesting document properties using the different weightings of the different interesting document properties to emphasize more heavily weighted interesting document properties in the aggregate score.

10. The method of claim 6, further comprising using centroid based clustering to determine a representativeness score for a document.

11. A computer program product embodied as computer-readable instructions stored on a non-transient computer-readable media and executable by a processor to output a publication of compiled content pieces by computing a decision problem and automatically selecting content that is determined to be interesting to a readership of the publication, comprising:
instructions for identifying a set of multiple interesting document properties, each of the interesting document properties being a different document property that indicates whether a corresponding document as a whole, will be interesting to the readership of the publication;
instructions for generating a plurality of scores for each document in a library of documents each score based on a different one of the interesting document properties, such that, for each document in the library, a plurality of scores for that document is determined, one score as to each of the plurality of interesting document properties;
instructions for selecting, based on the scores, a set of input documents from among the documents of the library;
instructions for identifying a plurality of different document set properties that are different from the interesting document properties, each document set property characterizing a different aspect of a document set as to suitability for the publication;
instructions for selecting a subset of documents from the set of input documents:
instructions for determining a score of the subset of documents based on the document set properties;
instructions for determining whether to include the subset in the publication based on the score of the subset with regard to the document set properties: and,
instructions for, when a first subset of input documents is approved for the publication based on the document set properties, producing the publication including the documents in the first subset.

12. The computer program product of claim 11, wherein scores for each of the separate interesting document properties are combined to derive an aggregate score for each document.

13. The computer program product of claim 11, wherein the scores of the interesting properties of the subset are aggregated into a single score, and the subset is selected based at least in part on the single score.

14. The computer program product of claim 11, further comprising instructions for assigning different weightings to the different interesting document properties.

15. A system comprising a user interface, a processor and computer-readable instructions sic on a non-transient computer-readable media and executable by the processor to produce a publication of compiled content pieces, the instructions to cause the processor to:
identify a set of interesting document properties, the set comprising a plurality of document properties, Wherein each of the document properties is a different document property that indicates whether a corresponding document should be included in the compiled publication and will be interesting to the readership of the publication, the interesting document properties comprising novelty as a measure of whether information contained in the document has already been provided to the readership;
identify a set of input documents, wherein each input document possesses each of the interesting document properties to a greater or lesser degree relative to other documents in the set of input documents;
generate a plurality of rankings for each document in a set of input documents, each ranking based on a different one of the interesting document properties, such that, for each document in the set of input documents, a plurality of rankings for that document is determined, one ranking as to each of the plurality of interesting document properties for each input document;
select a subset of the set of input documents, wherein each document selected for the subset is based on rankings of the selected document relative to other documents of the set of input documents;
determine a score of a plurality of interesting properties of the subset of input documents collectively;
determine whether to include the subset in the publication based on the interesting properties of the subset; and,
when a first subset of input documents is approved for the publication based on the interesting properties of the subset, producing the publication including the documents in the first subset.

16. The system of claim 15, further comprising instructions for combining rankings for each of the separate interesting document properties to derive an aggregate score for each document in the set of input documents, wherein selecting the subset is based on the aggregate score.

17. The system of claim 15, wherein selecting the subset is based on at least one of user feedback and external sources for identifying desired article properties.

18. The system of claim 15, further comprising instructions for aggregating the interesting properties of the subset into a single score, wherein the subset is selected for inclusion in the publication based at least in part on the single score.

19. The system of claim 15, wherein the interesting document properties further include relevance, representativeness, contextual proximity, timeliness, severity, and authoritativeness.

20. The system of claim 15, wherein interesting properties of the subset are different from the interesting document properties and include diversity, coverage, and balance.

* * * * *